United States Patent
Hayward et al.

(10) Patent No.: US 8,644,138 B2
(45) Date of Patent: Feb. 4, 2014

(54) METHOD, COMPUTER PROGRAM PRODUCT, AND APPARATUS FOR DERIVING INTELLIGENCE FROM FORMAT CHANGE REQUESTS

(75) Inventors: David Hayward, Lincroft, NJ (US); Aldo Adriazola, Bridgewater, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 427 days.

(21) Appl. No.: 12/625,232

(22) Filed: Nov. 24, 2009

(65) Prior Publication Data

US 2011/0126054 A1    May 26, 2011

(51) Int. Cl.
*H04L 12/26* (2006.01)

(52) U.S. Cl.
USPC ........................................................ 370/229

(58) Field of Classification Search
USPC ................. 370/229–235, 241–245, 464–467; 709/223–226
See application file for complete search history.

(56) References Cited

U.S. PATENT DOCUMENTS

| | | | |
|---|---|---|---|
| 6,247,050 B1 * | 6/2001 | Tso et al. | 709/224 |
| 6,421,733 B1 * | 7/2002 | Tso et al. | 709/246 |
| 6,615,212 B1 * | 9/2003 | Dutta et al. | 1/1 |
| 7,219,163 B2 * | 5/2007 | Robinson et al. | 709/246 |
| 7,768,929 B2 * | 8/2010 | Karacali-Akyamac et al. | 370/242 |
| 7,770,200 B2 * | 8/2010 | Brooks et al. | 725/95 |
| 2004/0073925 A1 * | 4/2004 | Kinoshita | 725/46 |
| 2004/0078787 A1 * | 4/2004 | Borek et al. | 717/136 |
| 2004/0221296 A1 * | 11/2004 | Ogielski et al. | 719/313 |
| 2005/0091696 A1 * | 4/2005 | Wolfe et al. | 725/116 |
| 2007/0038773 A1 * | 2/2007 | White et al. | 709/233 |
| 2009/0064255 A1 * | 3/2009 | Jiang et al. | 725/118 |

* cited by examiner

*Primary Examiner* — Dmitry H Levitan
(74) *Attorney, Agent, or Firm* — Parks IP Law LLC; Jennifer P. Medlin, Esq.

(57) ABSTRACT

Data indicating a problem in a network is derived by collecting reformatting requests from devices in the network. The reformatting requests are generated by the devices in response to problems the devices experience in communicating using the network. The reformatting requests are correlated to determine a pattern in the reformatting requests over a period of time, and data indicating a problem in the network is derived based on the pattern.

20 Claims, 3 Drawing Sheets

METHOD, COMPUTER PROGRAM PRODUCT, AND APPARATUS FOR DERIVING INTELLIGENCE FROM FORMAT CHANGE REQUESTS

BACKGROUND

Exemplary embodiments relate generally to deriving information and, in particular, deriving information from a network.

With the advent of fixed/mobile convergence, it will become increasingly likely that the quality of service experienced by a customer will vary as a multimedia session is redirected to different devices (e.g., PCs, TVs, wireless PDAs) connected using different technologies (e.g., broadband, wireless) through varying locations.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the invention.

According to an exemplary embodiment, a method for deriving data indicating a problem in a network includes collecting reformatting requests from devices in the network. The reformatting requests are generated by the devices in response to problems the devices experience in communicating using the network. The method further includes correlating, via a server, the reformatting requests to determine a pattern in the reformatting requests over a period of time. Data indicating a problem in the network is derived based on the pattern.

According to another embodiment, a computer program product includes a computer readable storage medium having encoded instructions stored thereon for deriving data indicating a problem in a network. The instructions, when executed by a computer, cause the computer to collect reformatting requests from devices in the network. The reformatting requests are generated by the devices in response to problems the devices experience in communicating using the network. The reformatting requests are correlated to determine a pattern in the reformatting requests over a period of time. Data indicating a problem in the network is derived based on the pattern.

According to another embodiment, a system for deriving data indicating a problem in a network includes an input for receiving reformatting requests from devices in the network. The reformatting requests are generated by the devices in response to problems the devices experience in communicating using the network. The system further includes a correlator for correlating the reformatting requests to determine a pattern in the reformatting requests over a period of time. Data indicating a problem in the network is derived based on the pattern.

According to another embodiment, other methods, computer program products, and/or systems according to various embodiments will be or become apparent to one with skill in the art upon review of the following drawings and detailed description. It is intended that all such additional systems, methods, and/or computer program products be included within this description, be within the scope of the present invention, and be protected by the accompanying claims.

DETAILED DESCRIPTION

Figure 1:
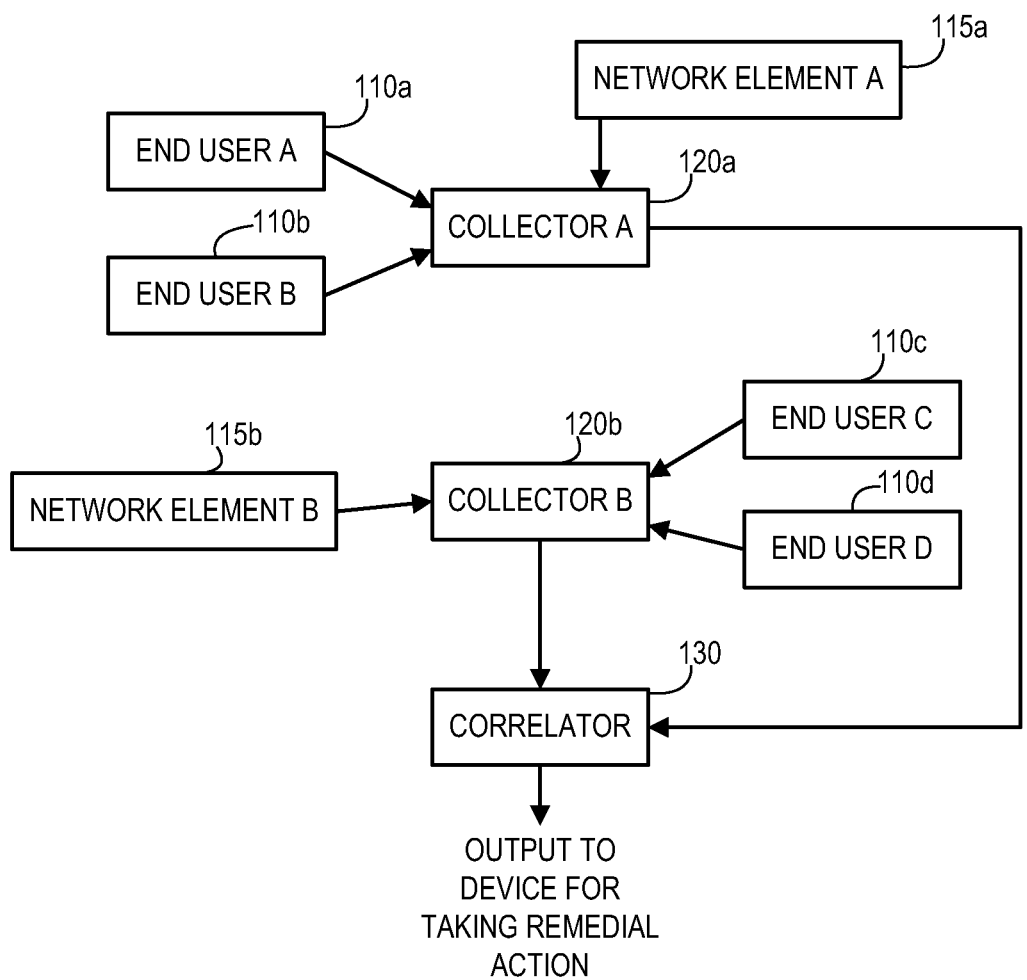
FIG. 1 illustrates a system for collecting data, correlating the collected data, and deriving data indicating a problem in a network according to an exemplary embodiment.

Exemplary embodiments will be described more fully hereinafter with reference to the accompanying figures, in which embodiments are shown. This invention may, however, be embodied in many alternate forms and should not be construed as limited to the embodiments set forth herein.

Exemplary embodiments are described below with reference to block diagrams and/or flowchart illustrations of methods, apparatus (systems and/or devices) and/or computer program products. It should be understood that a block of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, digital signal processor and/or other programmable data processing apparatus to produce a machine, such that the instructions, which execute via the processor of the computer and/or other programmable data processing apparatus, create means (functionality) and/or structure for implementing the functions/acts specified in the block diagrams and/or flowchart block or blocks.

These computer program instructions may also be stored in a computer-readable memory that can direct a processor of the computer and/or other programmable data processing apparatus to function in a particular manner, such that the instructions stored in the computer-readable memory produce an article of manufacture including instructions which implement the function/act as specified in the block diagrams and/or flowchart block or blocks.

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks.

Accordingly, exemplary embodiments may be implemented in hardware and/or in software (including firmware, resident software, micro-code, etc.) that runs on a processor such as a digital signal processor, collectively referred to as "circuitry" or "a circuit". Furthermore, exemplary embodiments may take the form of a computer program product comprising a computer-usable or computer-readable storage medium having computer-usable or computer-readable program code embodied in the medium for use by or in connection with an instruction execution system. In the context of this document, a computer-usable or computer-readable medium may be any medium that can contain, store, communicate or transport the program for use by or in connection with the instruction execution system, apparatus, or device.

The computer-usable or computer-readable medium may be, for example but not limited to, an electronic, magnetic, optical, electromagnetic or semiconductor system, apparatus or device. More specific examples (a non-exhaustive list) of the computer-readable medium would include the following: a portable computer diskette, a random access memory (RAM), a read-only memory (ROM), an erasable programmable read-only memory (EPROM or Flash memory), and a portable optical and/or magnetic media, such as a flash disk or CD-ROM.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated.

There exist a number of intelligent end user devices, also referred to herein as receivers, which use various wired and wireless access technologies. Many of these devices have the capability to receive multimedia streams. A stream is formatted for a particular receiver based upon the capabilities of the device and the characteristics of the communication channel over which the stream is transmitted. As conditions in the communication channel vary, a multimedia stream may require reformatting. For instance, if there is congestion in one or more network links or there is impairment in a wireless channel, receivers may request that streams be transmitted at a lower bit rate in order to ensure uninterrupted delivery of data. Another option may be to switch to a different (perhaps more complex/costly) encoding format that has a greater tolerance to particular types of impairment, such as delay, bit errors or jitter. In all these cases, time-varying network conditions may be adapted by trading off one parameter (e.g., processing complexity/cost, picture resolution, or audio fidelity) to improve the end-user's overall quality of experience. Such action requires end user devices or other network elements to recognize that the experience is being "impaired" and to request the network to modify the stream accordingly.

Depending on its level of sophistication, an end user device may recognize individual impairment types and request a particular format that better tolerates the impairment being experienced. Regardless of the exact mechanism used to initiate a "reformat request," any such request indicates a failure or degradation somewhere in the end-to-end arrangement, from the source of the multimedia stream through all the various connectivity technologies, to the receiver. By collecting and correlating data related to requests for stream reformatting, information about the likely cause(s) of these requests may be derived, and the cause may be isolated and resolved.

If service quality degrades beyond an acceptable threshold, customer equipment (end user device) or network equipment can request the multimedia stream be modified into a format better suited to the changing conditions thereby providing a better quality of experience. While this may correct the problem for an individual customer or an individual network element, it does not prevent other customers or network elements, operating under similar conditions, states, locations, equipment and the like, from experiencing the same problem. This disclosure uses aggregate information derived from a set of corrective actions (like that described above) to identify the cause and/or location of these problems, thus enabling proactive preventive measures According to exemplary embodiments, network and device performance and operational information is extracted from requests to reformat multimedia streams. Such requests result from the detection of low quality of experience by either end-user devices or network-based equipment. According to an exemplary embodiment, poor quality in a multimedia stream is detected, and a different, e.g., more robust, format is requested in order to improve the customer/network element experience. Poor performance and/or quality may be automatically recognized, and a reformatting request may be automatically initiated, or poor performance/quality may be recognized, and a reformatting request may be generated manually, e.g., by an end user. Elements are provided that are capable of recognizing and responding to these requests and creating a "data point" associated with each request. The data points contain information about the format change request, such as the device making the request, the time at which the format change request was made, software, firmware and hardware versions, location of the device making request, transmission technologies used to transport the request, original format, new format, original bit rate, new bit rate, specific network elements traversed by the stream, etc.). Data collector(s) gather/accept these data points and correlation engine (s) can sort these data elements and identify patterns which indicate specific trouble(s). Information about the troubles identified may be communicated to a device, such as an operations center, such the remedial action may be taken.

FIG. 1 illustrates a system for collecting data, correlating the collected data, and deriving data indicating a problem in a network according to an exemplary embodiment. The system includes various end user devices 110a, 110b, 110c and 110d and network elements 115a and 115b in communication with one or more collectors 120a and 120b. The end user devices may include various types of communication devices, including but not limited to television sets, radios, personal computers, cellular telephones, video conferencing equipment, audio bridges, and hand-held mobile televisions capable of receiving and transmission multimedia streams.

The network elements 115a, 115b may include devices such as transceivers, switches, and encoders. The encoders convert incoming multimedia data streams into output of a specific format and bit rate. Examples of formats include Moving Pictures Expert Group Layer-3 Audio (MP3) MP3 and Advanced Audio Coding (AAC) for audio, Moving Pictures Expert Group Layer-2 Video (MPEG-2) and Moving Pictures Expert Group Layer-4 Video (MPEG-2) for video, and Enhanced Full Rate (EFR) and Adaptive Multi-Rate (AMR) for cellular. The end user devices 110a, 110b, 110c, and 110d and the network elements 115a and 115b may communicate with each other and with collectors 120a and 120b via communications channels, such as fiber optic cables, copper wires and various wireless technologies. Multimedia streams may flow over these channels.

For purposes of this disclosure, multimedia streams may be considered as continuous flows of content. Examples of multimedia streams include audio streams (e.g., radio programming, phone calls) or audio/video streams (e.g., television programming, multimedia conference calls). Multimedia streams may also contain only video information (e.g., traffic webcam) or alphanumeric information (e.g., stock quotes, sports scores).

Although not shown in FIG. 1 for simplicity of illustration, it should be appreciated that the network may also include content sources, e.g., content providers. Also, the end user devices may be considered content sources.

From time to time, deficiencies or failures may occur in component elements of a communications channel. These deficiencies or failures, also referred to as impairments, may include such things as loss of a transmission facility due to equipment failure, break in optical cable, excessive delay or variation in delay, high bit error rates, etc.

The collectors 120a and 120b record information (data points) from the end user devices 110a, 110b, 110c, and 110d and network elements 115a and 115b within the communication network. According to exemplary embodiment, the data collected by the collectors 120a and 120b may be reformatting requests generated by the end user devices or network elements. According to exemplary embodiments, the extraction and intelligent processing of network and device performance and operational information may be performed based on requests to reformat multimedia streams. Such requests result from the detection of low quality of experience by either end-user devices or network-based equipment.

The collected data is delivered to a correlation engine 130. The correlation engine 130, which may be implemented as a server, analyzes a set of data points to identify common characteristics and derive data indicating a problem in the communications network. Some examples of characteristics which may be included in data points are communication channels, network elements, end-user devices, sources, terrain, environment conditions, and time of day, format and bit rate used by streams. The data points may be collected over a period of time, e.g., a week or a number of hours, and the correlator 130 determines a pattern in the data points. Based on the pattern, a problem in the network, e.g., a dead spot in a cellular network, a time of day during which capacity needs to be increased, or a device problem, may be discerned. By correlating the data points, the correlation engine 130 produces data indicative of this problem such that an operations center can act on the program and take remedial actions as appropriate, e.g., repair the dead spot, increase network bandwidth as needed, indicate to the end user that there is a problem with the end user device, etc.

Although shown as separate devices for ease of understanding, it should be appreciated that the collectors and the correlation engine may be integrated into one or more devices. Also, it should be appreciated that the communication network may include any number of end user devices and network elements.

Figure 2:
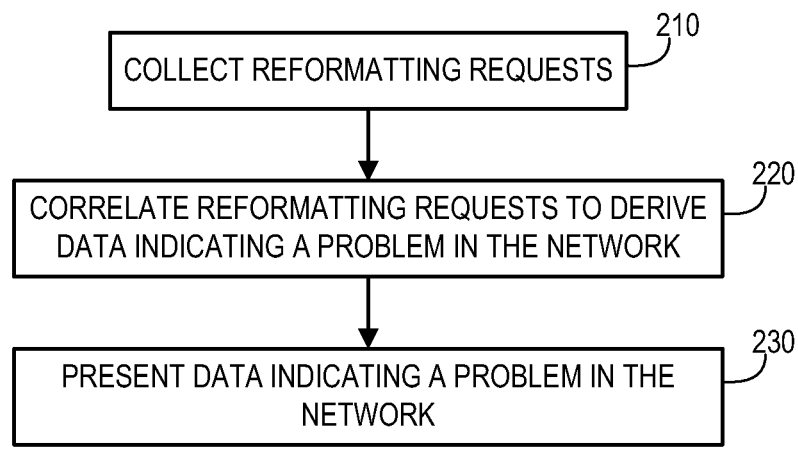
FIG. 2 is a flowchart illustrating a method for deriving data indicating a problem in a network according to an exemplary embodiment.

FIG. 2 is a flowchart illustrating a method for deriving data indicating a problem in a network according to an exemplary embodiment. At step 210, reformatting requests are collected by, e.g., collectors 120a and 120b. The reformatting requests may be generated by the end user devices, e.g., devices 110a, 110b, 110c and/or 110d, or network elements, e.g., network element 115a and/or network element 115b. The reformatting requests are correlated to derive data indicating a problem in the network at step 220. This correlation may be performed in correlation engine 130. Data indicating a problem in the network is presented at step 230, such that remedial action may be taken to resolve the problem.

Figure 3:
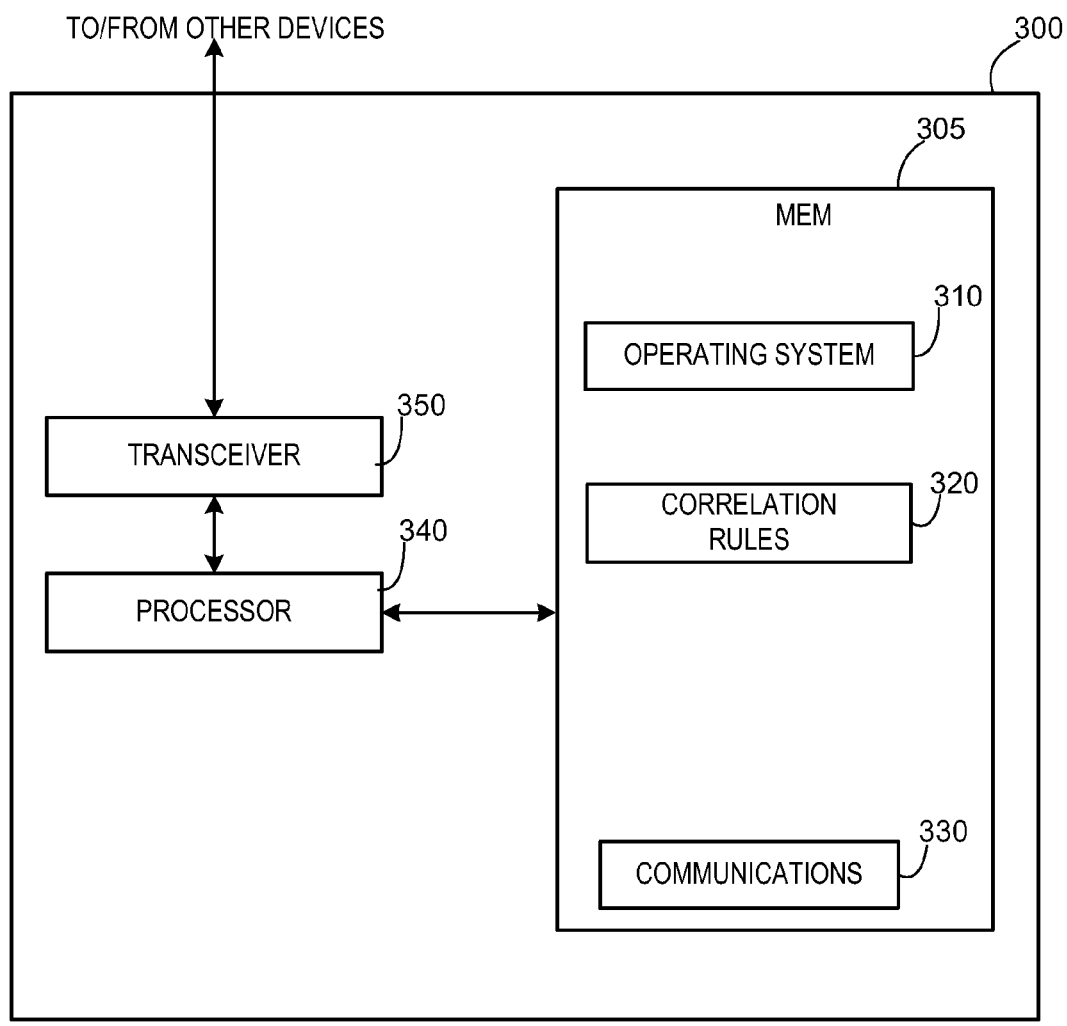
FIG. 3 illustrates an exemplary device for deriving data indicating a problem in a network according to an exemplary embodiment.

FIG. 3 illustrates an exemplary device for deriving data indicating a problem in a network according to an exemplary embodiments. Referring now to FIG. 3, the system 300 includes a processor 340, a transceiver 350, and a memory 305. The processor 340 communicates with the memory 305 via an address/data bus. The processor 340 may be, for example, a commercially available or custom microprocessor. The memory 305 is representative of the one or more memory devices containing the software and data used to facilitate application of the rules for access by an observer device to a communication session in accordance with some embodiments. The memory 305 may include, but is not limited to, the following types of devices: cache, ROM, PROM, EPROM, EEPROM, flash, SRAM, and DRAM. The transceiver 350 includes a transmitter circuit and a receiver circuit, which are used to establish and maintain communication with other devices, such as the collectors 110a and 110b shown in FIG. 1, and devices used for taking remedial actions, such as a network control center?.

As shown in FIG. 3, the memory 305 may contain multiple categories of software and/or data: an operating system 310, a correlation rules module 320, and a communication module 330. The operating system 310 generally controls the operation of the correlation rules module 320. In particular, the operating system 310 may manage the correlation rules module's software and/or hardware resources and may coordinate execution of programs by the processor 340. The communication module 330 may be configured to manage the communication protocols, including both wireless and wireline protocols that may be used by the transceiver 350 to communicate with other devices in the communication network, such as the collectors 120a and 120b shown in FIG. 1. The communication protocols may include, but are not limited to TCP/IP, H.323, etc. The communication module 330 may control conversion of signals received in one type of communication protocols into an appropriate format/protocol for transmission to other devices.

Although FIG. 3 illustrates an exemplary device for correlating reformatting requests to derive data indicating a problem in a network, in accordance with some embodiments, it will be understood that the present invention is not limited to such a configuration but is intended to encompass any configuration capable of carrying out operations described herein.

As an aid to understanding exemplary embodiments, examples are presented below. In the following examples, the source of the multimedia stream is assumed to a content provider within the communication network, and the receivers are considered to be the end user customer/subscriber devices. The reverse may also be true. That is, the source of the signal may be an end user (customer or subscriber) device, while the receiver may a network element within the service provider's network. The correlation engine processes data collected from the receivers, irrespective of their location.

In a first example, congestion occurs on a network link. This example may be understood by considering a number of residential customers or users of end user devices, e.g. devices 110a, 110b, 110c, 110d, watching streams originating in a communication network via high speed Internet connections. The video quality begins to degrade as determined by the receiver (end user device). The end user device requests that the source send the transmission at a lower bit rate. A data collector, e.g., data collectors 120a, 120b within the network gathers information about multimedia stream bit rate changes. The collector sends its information to a correlation engine, which also has received information about network topology. The correlation engine, e.g., correlator 130, maps a number of receivers requesting a lower bit rate to a specific set of links within the network. An alert may be sent from the correlator 130 to an operations center indicating possible congestion on the identified links.

In a second example, there is a malfunction of a wireless network element. To illustrate this example, consider various mobile devices, e.g., end user devices 110a, 110b, 110c, 110d, receiving multimedia streams from a communication network. The devices are in motion. As they move, they associate with a cell site, and immediately stream quality begins to degrade. The mobile devices request that the streams be transmitted at a lower bit rate. A data collector within the network, e.g., data collectors 120a, 120b, gathers information about the bit range changes and sends that information to a correlation engine, e.g., correlator 130. The correlation engine determines that a high percentage of wireless devices associated with the particular cell site request lower bit rates. An alert may be sent from the correlator 130 to an operations center indicating that there is a possible problem with the cell site.

In a third example, there is an encoder malfunction. To illustrate this example, consider many devices receiving a multimedia stream. The customers or users of the devices request that the source send the stream at a lower bit rate. Data collectors, e.g., data collectors 120a, 120b, record the requests for a lower bit rate and forward that information to a correlation engine, e.g., correlator 130. The correlation engine determines that a high percentage of devices on all networks receiving a stream originating from a particular encoder request a lower bit rate. An alert may be sent from the correlator 130 to the operations center indicating that there is a possible problem with the encoder.

In a fourth example, there is an end user device problem. To illustrate this example, consider reformat request data collected over time (perhaps as long as weeks or months) that shows a strong correlation to a particular brand and model (and perhaps hardware vintage and/or software version) wireless device. From the data collected, the correlator 130 determines that it is apparent that the end user devices, e.g., devices 110a, 110b, 110c, and/or 110d, have (perhaps unacceptably) low tolerance to certain types of channel impairments. Based on this, a service provider may take any of several steps such as: informing the device provider of the suspected problem and requesting it be corrected, discontinuing sales of the device, informing users of the device limitation and recommending the user reconfigure the device, avoid use of certain features/capabilities, exchange the device for a different vintage, etc, changing the default encoding format (or device option settings or the like) used for this device to one that does not exhibit the problem or provides a better user experience, upgrading the device to a new software version that corrects the problem or lessens its impact on the user thus reducing the volume of format change requests, and/or modifying network infrastructure to reduce/eliminate the trouble-inducing impairment.

In a fifth example, a problem occurs due to stream source capacity. In this example, consider reformat request data collected by, e.g., collectors 110a, 110b, 110c, and 110d over the course of a day (or several days). The correlator 130 determines that the collected data indicates a degradation of multimedia streams originating from a particular location (e.g., an individual server, data center, access link), perhaps occurring at the same time each day. Based on the particular circumstances, the service provider may take any number of steps such as: recommending capacity enhances (e.g., more servers, higher capacity access line, different encoding format) to the content provider. If the service provider is also providing "hosting services" to the content originator, it may proactively take any of the steps listed above, or recommend an alternative solution to the content originator, such as an intelligent content distribution service, and/or alert customer care personnel (or provide real-time status on a website) who can then inform end-users of the trouble source in response to complaints.

In a sixth example, an encoding format problem occurs. In this example, assume that a new encoding format is introduced in the network. Over time, a pattern of format change requests collected by, e.g., collectors 110a, 110b, 110c, 110d is determined (by a correlation engine 130) which indicates that this format does not perform well under certain conditions, such as particular transmission channel type(s), terrains (e.g., hilly, water surfaces) or environments (e.g., urban canyons), climatic conditions, or a combination of these factors. Knowledge of such limitations may potentially be used to avoid use of that format under problematic conditions or environments, instigate improvements to the format, eliminate use of this format, etc.

According to an exemplary embodiment, a system and technique are provided for root cause analysis of recurring troubles associated with non-stationary multimedia sessions. This technique allows information about network or equipment troubles to be derived from the cumulative troubles experienced by a number of individual, unrelated customers/users occurring over a period of time. Without this capability, these troubles would take longer to recognize or may not be identified at all. Once identified, proactive preventive measures can be taken to eliminate or avoid these troubles, thus improving customer satisfaction and loyalty, as well as reducing expense related to trouble isolation and correction.

Computer program code for carrying out operations of devices, terminals, and/or systems discussed above with respect to FIGS. 1-3 may be written in a high level programming language, such as Java, C, and/or C++, for development convenience. In addition, computer program code for carrying out operations of embodiments may also be written in other programming languages, such as, but not limited to, interpreted languages. Some modules or routines may be written in assembly language or even micro code to enhance performance and/or memory usage. It will be further appreciated that the functionality of any or all of the program modules may also be implemented using discrete hardware components, one or more application specific integrated circuits (ASICs), or a programmed digital signal processor or microcontroller.

Exemplary embodiments are described herein with reference to message flow, flowchart and/or block diagram illustrations of methods, devices, and/or computer program products. These message flow, flowchart and/or block diagrams further illustrate exemplary operations for performing correlation of reformatting request to derive data indicating a problem in a network in accordance with various embodiments. It will be understood that each message/block of the message flow, flowchart and/or block diagram illustrations, and combinations of messages/blocks in the message flow, flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions specified in the message flow, flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the message flow, flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the message flow, flowchart and/or block diagram block or blocks.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of all combinations and subcombinations of the embodiments described herein, and of the manner and process of making and using them, and shall support claims to any such combination or subcombination.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A method, for deriving data indicating a problem in a network, comprising:
    collecting, by a server, reformatting requests from devices in the network, wherein the reformatting requests are generated by the devices in response to impairments the devices experience in communicating using the network;
    aggregating, by the server, the reformatting requests collected over a period of time;
    analyzing, by the server, the aggregated reformatting requests collected over the period of time to identify common characteristics indicating a pattern in the reformatting requests collected over the period of time; and
    deriving, by the server, data indicating the problem in the network based on the pattern.

2. The method of claim 1, wherein the devices include at least one of end user devices and network devices.

3. The method of claim 1, wherein the problem is caused by at least one of an end user device and a network device.

4. The method of claim 1, wherein the problem is a lack of capacity in the network for handling traffic.

5. The method of claim 1, wherein the network is a multimedia network.

6. The method of claim 1, wherein the network is a cellular network.

7. The method of claim 1, wherein remedial actions are taken based on the derived data.

8. A non-transitory computer readable storage device having instructions encoded thereon for deriving data indicating a problem in a network, the instructions, when executed by a computer, causing the computer to perform operations comprising:
    collecting reformatting requests from devices in the network, wherein the reformatting requests are generated by the devices in response to impairments the devices experience in communicating using the network;
    aggregating the reformatting requests collected over a period of time;
    analyzing the aggregated reformatting requests collected over the period of time to identify common characteristics indicating a pattern in the reformatting requests collected over the period of time; and
    deriving the data indicating the problem in the network based on the pattern.

9. The non-transitory computer readable storage device of claim 8, wherein the devices include at least one of end user devices and network devices.

10. The non-transitory computer readable storage device of claim 8, wherein the problem is caused by at least one of an end user device and a network device.

11. The non-transitory computer readable storage device of claim 8, wherein the problem is a lack of capacity in the network for handling traffic.

12. The non-transitory computer readable storage device of claim 8, wherein the network is a multimedia network.

13. The non-transitory computer readable storage device of claim 8, wherein the network is a cellular network.

14. The non-transitory computer readable storage device of claim 8, wherein remedial actions are taken based on the derived data.

15. A system, for deriving data indicating a problem in a network, comprising:
    a processor; and
    a memory storing instructions which, when executed by the processor cause the processor to perform operations comprising:
        aggregating reformatting requests received from devices in the network over a period of time;
        analyzing the aggregated reformatting requests received from the devices in the network over the period of time to identify common characteristics indicating a pattern in the reformatting requests received over the period of time, wherein the reformatting requests are generated by the devices in response to impairments the devices experience in communicating using the network; and
        deriving the data indicating the problem in the network based on the pattern.

16. The system of claim 15, wherein the devices include at least one of end user devices and network devices.

17. The system of claim 15, wherein the problem is caused by at least one of an end user device and a network device.

18. The system of claim 15, wherein the problem is a lack of capacity in the network handling traffic.

19. The system of claim 15, wherein the network includes at least one of a multimedia network and a cellular network.

20. The system of claim 15, wherein remedial actions are taken based on the derived data.

* * * * *